US006430769B1

(12) United States Patent
Allen

(10) Patent No.: US 6,430,769 B1
(45) Date of Patent: Aug. 13, 2002

(54) WHEELCHAIR RAMP WITH KEYWAY JOINT

(76) Inventor: Richard D. Allen, 714 5th St., Fairbury, NE (US) 68352

( * ) Notice: Subject to any disclaimer, the term of this patent is extended or adjusted under 35 U.S.C. 154(b) by 0 days.

(21) Appl. No.: 09/698,380

(22) Filed: Oct. 27, 2000

(51) Int. Cl.[7] .............................. E01D 1/00; F16D 1/12; E05D 11/06
(52) U.S. Cl. ........................ 14/69.5; 403/113; 403/117; 16/374; 16/376
(58) Field of Search .......................... 14/69.5; 296/61; 414/537; 119/847, 849; 16/374, 376, 341, 342; 403/113, 117

(56) References Cited

U.S. PATENT DOCUMENTS

| | | | | |
|---|---|---|---|---|
| 128,191 A | * | 6/1872 | Wachob | 403/117 |
| 723,544 A | * | 3/1903 | Petre | 403/117 |
| 3,759,065 A | * | 9/1973 | Montefiore et al. | 464/167 |
| D246,449 S | * | 11/1977 | Poe | D12/5 |
| 4,334,338 A | * | 6/1982 | Conn | 16/266 |
| 4,478,549 A | * | 10/1984 | Stell et al. | 414/537 |
| 4,506,408 A | * | 3/1985 | Brown | 16/225 |
| D297,064 S | * | 8/1988 | Ball et al. | D34/32 |
| D299,776 S | * | 2/1989 | Canterberry | D34/32 |
| 5,287,579 A | * | 2/1994 | Estevez, Jr. | 14/71.1 |
| 5,325,558 A | | 7/1994 | Labreche | |
| 5,347,672 A | * | 9/1994 | Everard et al. | 14/69.5 |
| 5,881,431 A | * | 3/1999 | Pieper, II et al. | 16/82 |
| 5,933,898 A | * | 8/1999 | Estes et al. | 14/69.5 |
| 6,009,587 A | * | 1/2000 | Beeman | 14/69.5 |
| 6,119,634 A | * | 9/2000 | Myrick | 119/847 |
| 6,146,044 A | * | 11/2000 | Calvet | 403/119 |

FOREIGN PATENT DOCUMENTS

| | | | | |
|---|---|---|---|---|
| GB | 1038445 | * | 8/1966 | 14/69.5 |
| GB | 2 259 903 A | * | 3/1993 | 14/69.5 |

OTHER PUBLICATIONS

Prairie View Industries, Inc. Multifold Ramp, Marketing Brochure for prior multifold ramp on sale more than one year prior to the filing date of the present application.

* cited by examiner

Primary Examiner—Gary S. Hartmann

(57) ABSTRACT

A wheelchair ramp assembly (10) is disclosed as including a first ramp section (22) and a second ramp section (24) joined by a keyway joint (26). The keyway joint (26) connects the two ramp section (22, 24) surfaces when the ramp is in an extended position. The keyway joint (26) includes a first ramp section outer rotating member (64a) and a second ramp section outer rotating member (64b) that each rotate about an inner member (68). The inner member (68) is configured to limit the rotation of the outer members (64) with respect to one another, thereby limiting the rotation of the first ramp section (22) with respect to the second ramp section (24).

21 Claims, 5 Drawing Sheets

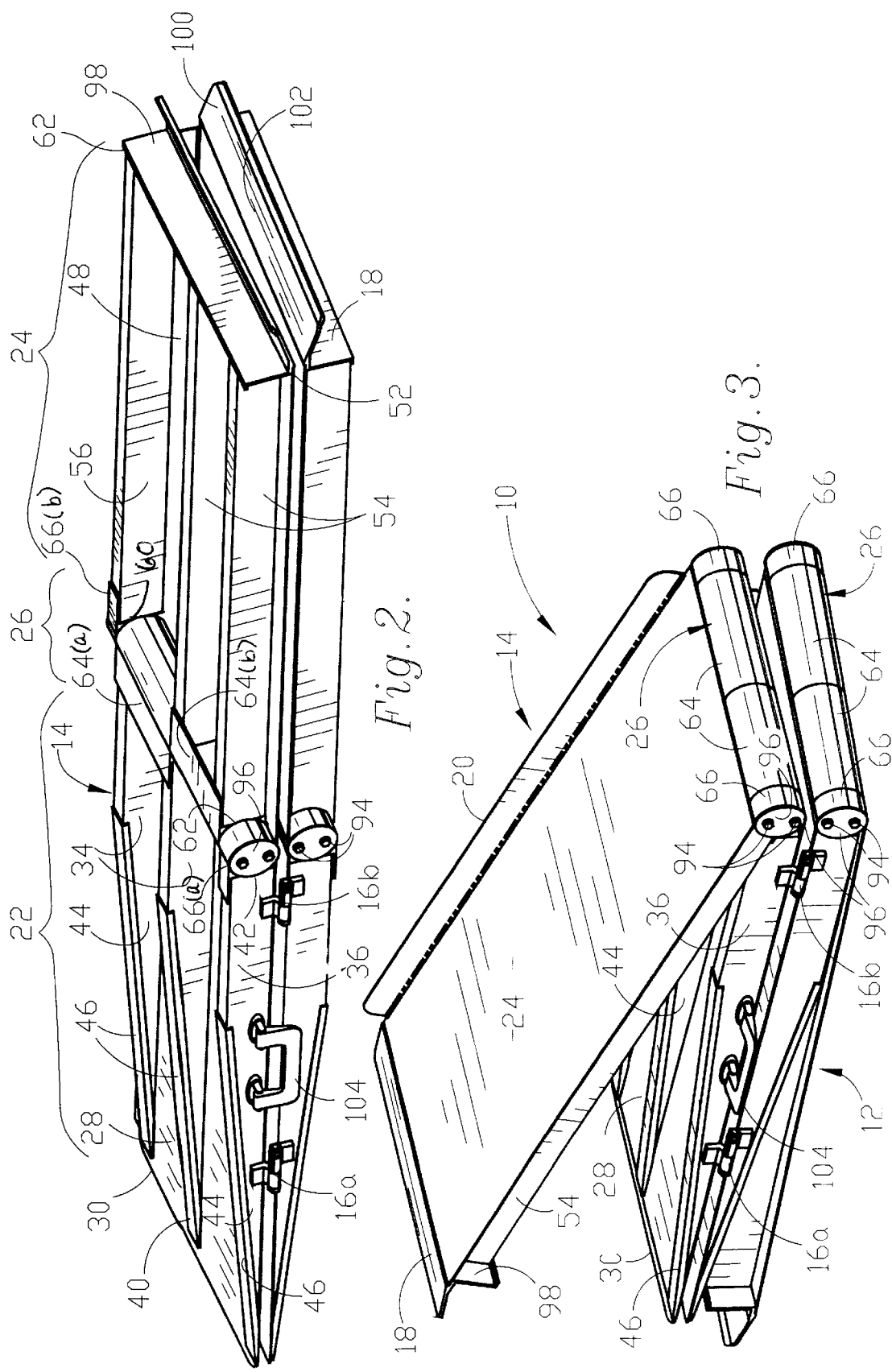

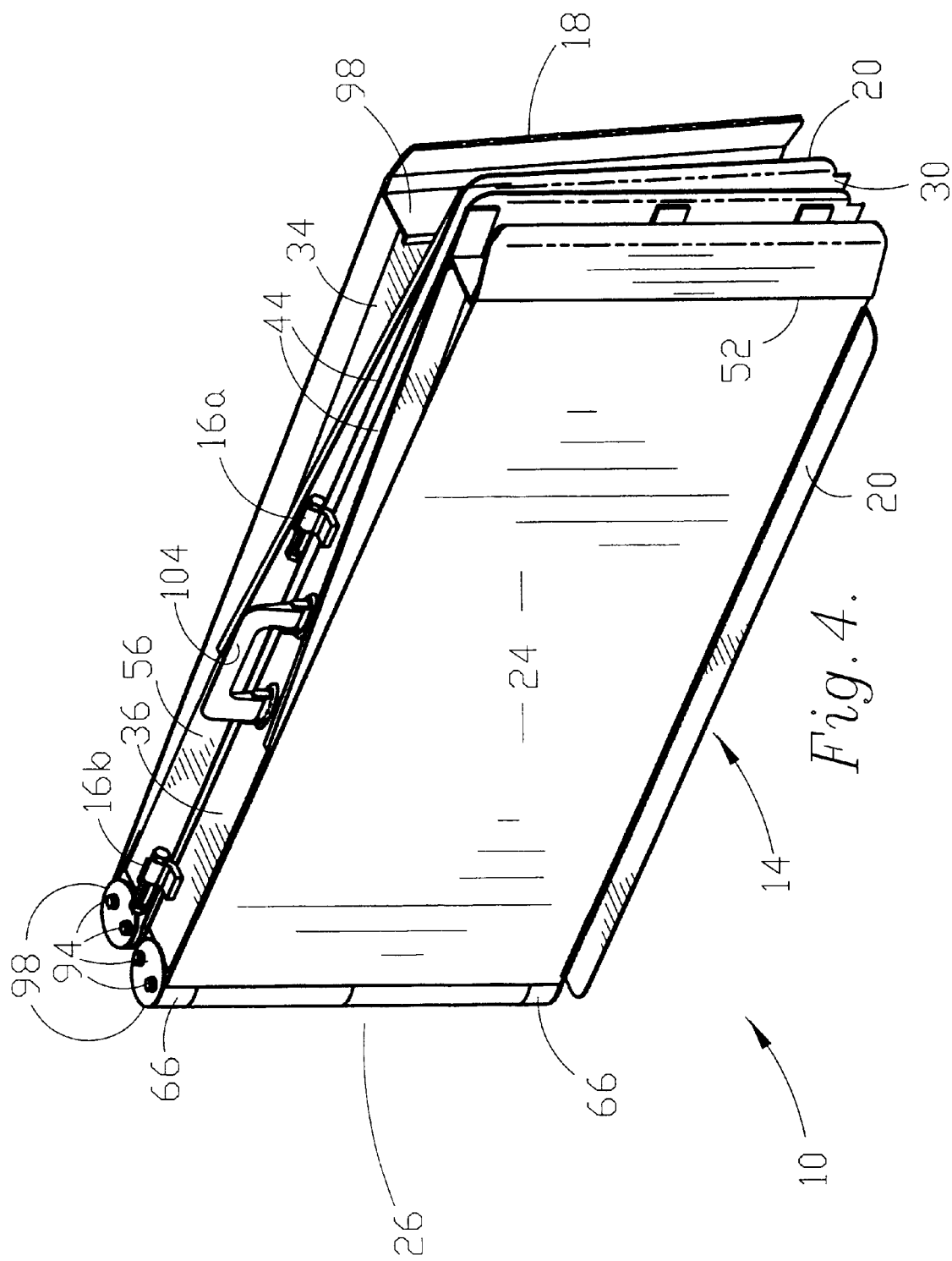

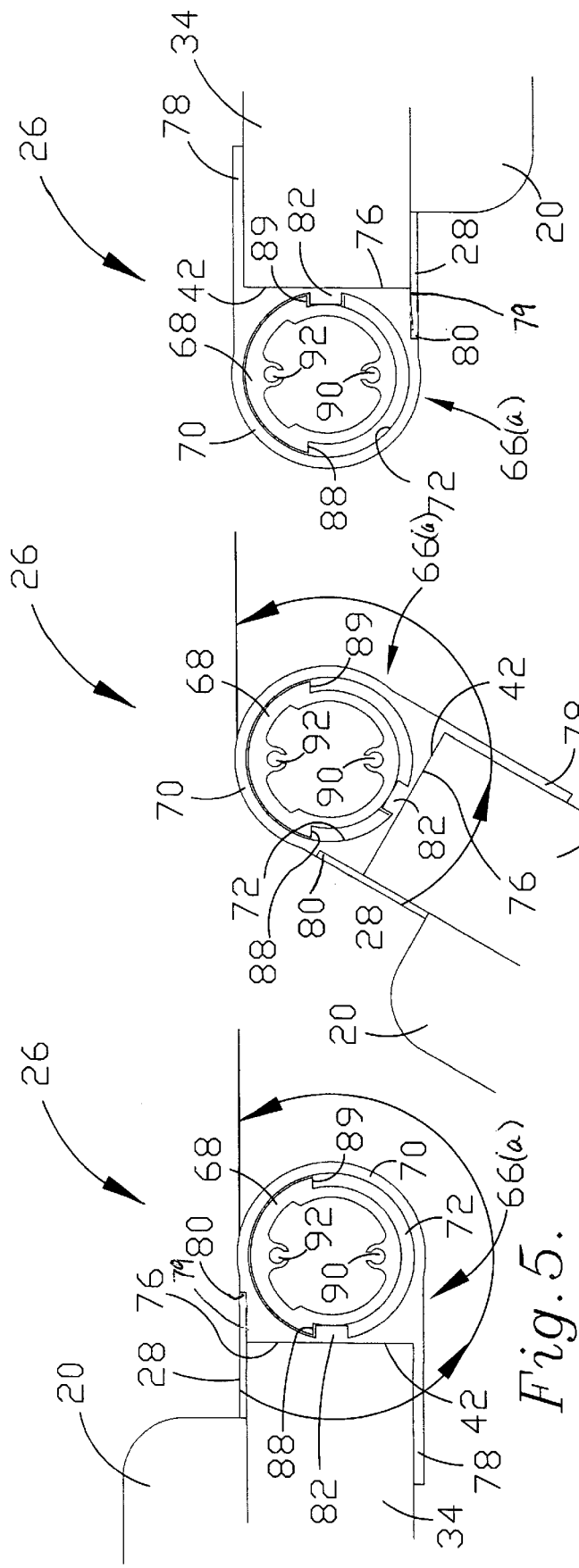

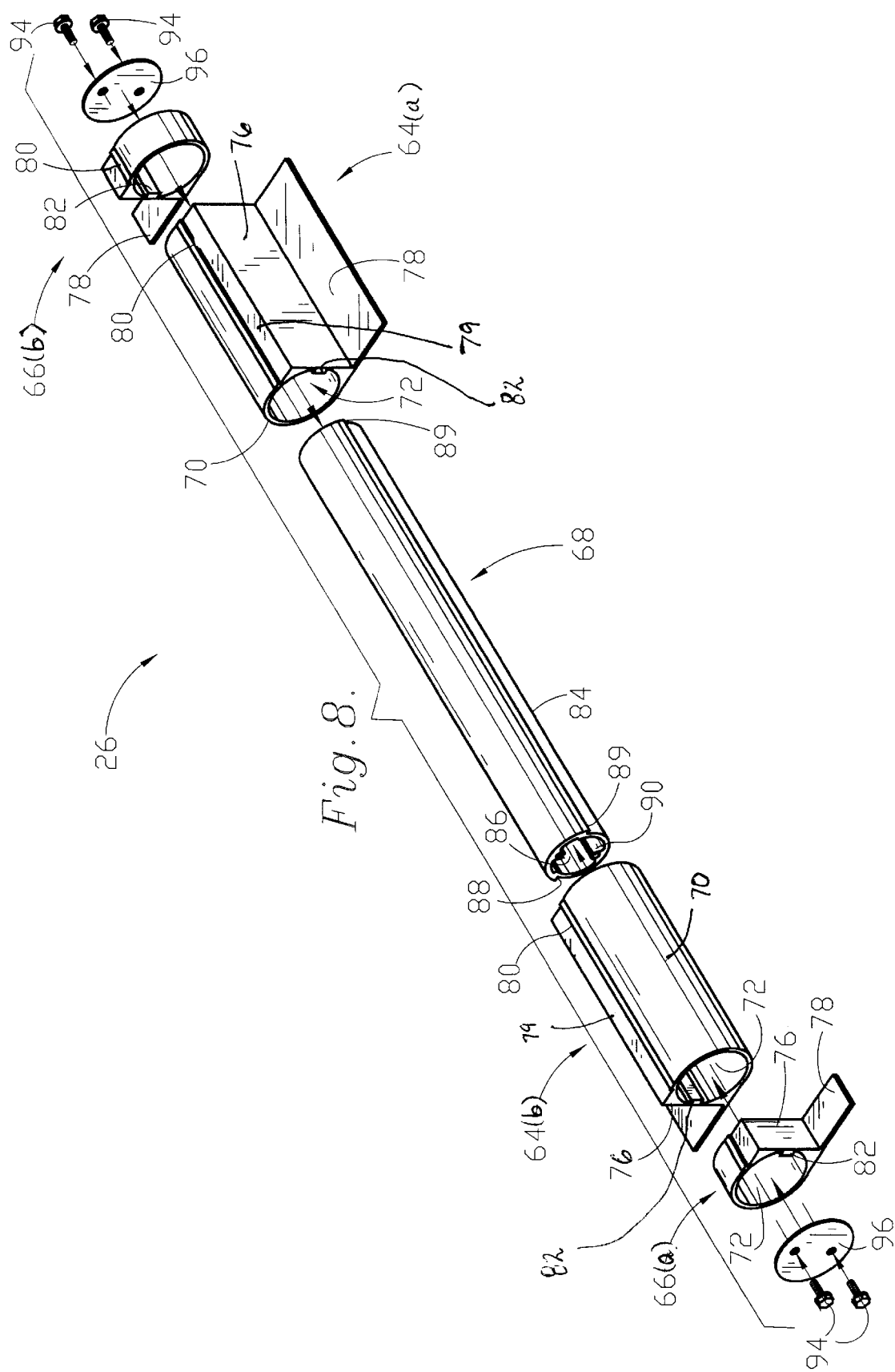

WHEELCHAIR RAMP WITH KEYWAY JOINT

BACKGROUND OF THE INVENTION

1. Field of the Invention

The present invention is generally directed to the field of ramps and inclines, and is more particularly directed to a portable folding wheelchair ramp having an improved joint with increased strength and durability to withstand repeated loads.

2. Description of Related Art

It is often difficult, if not impossible, for people using wheelchairs or walkers to transcend a series of steps, for example, or enter into a vehicle. To assist users in traveling over these type obstacles, ramp structures have been developed to provide an inclined surface on which the user can travel between the two elevations. Insofar as these obstacles can be encountered at a variety of different locations throughout the user's day, efforts have been made in the art to develop a portable ramp that could be easily transported from one location to another.

In order to make a ramp convenient for transport, it is desirable for the ramp to be relatively compact and lightweight so that it can be easily stored and carried for use. A particularly useful ramp design heretofore developed in the art for these purposes is a foldable ramp comprised of two or more sections which can be folded over one another into an overlapping relationship for carrying. The ramp sections are generally comprised of aluminum sheeting which provides a flat surface on which the wheelchair can move, and aluminum tubing welded or otherwise secured along the bottom surface of the sheeting to provide rib supports. The underlying rib supports of the ramp sections are pivotally hinged together such that the ramp sections can be folded into an overlapping compact position for carrying and unfolded into an extended position for use. In the unfolded position, a portion of the ramp section surfaces formed by the aluminum sheeting overlap at the interface of the two sections to present a relatively uninterrupted surface on which the wheelchair moves.

This prior ramp design is very portable because it can be folded into a compact configuration and because the aluminum materials from which it is made are lightweight. Even though the aluminum materials are lightweight, the use of underlying rib supports generally provides the strength needed to support the load of a wheelchair and its user. However, it has been found that after repeated use, the ramp construction is susceptible to fatigue at the location of the hinge. In particular, the aluminum sheeting tends to buckle and the underlying rib supports tend to break away from the adhesive and/or welds used to secure the supports to the sheeting.

Thus, a need has developed in the art for an improved foldable wheelchair ramp that is less susceptible to failure from material fatigue, yet remains lightweight, compact and provides a relatively smooth platform surface on which the wheelchair can travel.

SUMMARY OF THE INVENTION

This need is met by a foldable ramp comprising at least two ramp sections pivotally connected together such that the ramp sections may be folded over one another into an overlapping compact position for carrying, and unfolded into an extended position for use. A keyway joint is provided along the end of the ramp sections such that it connects the two ramp section surfaces when the ramp is in its extended position. The keyway joint operates by having an outer member rotate about an inner member, wherein the inner member limits the rotation of the outer member. It is believed that this type of pivotal connection between the ramp sections is less susceptible to fatigue than the overlapping connections previously used in the art to connect the ramp sections together. Thus, the use of a keyway joint connecting two ramp sections provides a distinct advance in the state of the art wherein the strength of the joint region of the ramp is increased so as to reduce the likelihood of failure from fatigue, while still providing a substantially compact and lightweight ramp for portable use.

In a preferred embodiment, the foldable ramp of the present invention has first and second ramp sections comprised of relatively thin substantially flat ramp surfaces and at least one support member secured to the bottom of each ramp surface. It also has a keyway joint secured in place along one end of each of the ramp surfaces connecting the ramp sections. The keyway joint includes a first rotating member having at least one shoulder and a second rotating member having a rib. The rib and the shoulder are configured to abut in such a manner as to limit the amount of rotation between the members. Preferably, the first rotating member is an internal shaft about which the second rotating member rotates. The internal shaft includes an outwardly extending shoulder that is configured to abut an inwardly extending rib on the second rotating member so as to stop rotation of the second rotating member when it reaches a predefined position. The limited rotation of the keyway joint allows the first and second ramp sections to move between a folded compact position and an open extended position.

In a most preferred embodiment, the keyway joint is comprised of a first collar attached to the first ramp section, a second collar attached to the second ramp section and an inner shaft inserted into the collars and about which the collars rotate. Each of the collars include an inner side wall having a longitudinally extending rib. The inner shaft includes a longitudinally extending pair of shoulders that are configured to abut each of the ribs when the sections are in the extended position so as to limit the amount of rotation of the keyway joint.

In the most preferred embodiment shown in the drawings, the ramp comprises four ramp sections wherein the first and second ramp sections define a left side of the ramp and the third and fourth ramp sections define a right side of the ramp. The left and right sides of the ramp substantially mirror each other, wherein the ramp sections of each side are pivotally connected to one another by a keyway joint as described above. The left and right sides of the ramp are joined together at one or more pivot points so that the sides may be folded over one another into an overlapping compact position, and unfolded into an extended position for use.

BRIEF DESCRIPTION OF THE DRAWINGS

FIG. 2 is a perspective view of the wheelchair ramp of FIG. 1, shown in the folded, but fully extended position;

FIG. 3 is a perspective view of the wheelchair ramp of FIG. 1, showing the right side of the ramp being folded into the compact position and the left side of the ramp in the folded compact position;

FIG. 4 is a perspective view of the wheelchair ramp of FIG. 1, shown in a fully folded compact position;

FIG. 5 is a fragmentary sectional view of the keyway joint of the wheelchair ramp of FIG. 1 with the ramp surface facing upward, showing a portion of the ramp surface and the keyway joint secured to a support member of the first section;

FIG. 6 is a fragmentary perspective view as in FIG. 5, except the support member of the first section is partially pivoted to fold the section into the compact position;

FIG. 7 is a fragmentary perspective view as in FIG. 6, except the support member of the second section is further moved to fold the section into the compact position; and FIG. 8 is an exploded, fragmentary perspective view of the keyway joint of the wheelchair ramp of FIG. 1.

DETAILED DESCRIPTION OF PREFERRED EMBODIMENT

Figure 1:
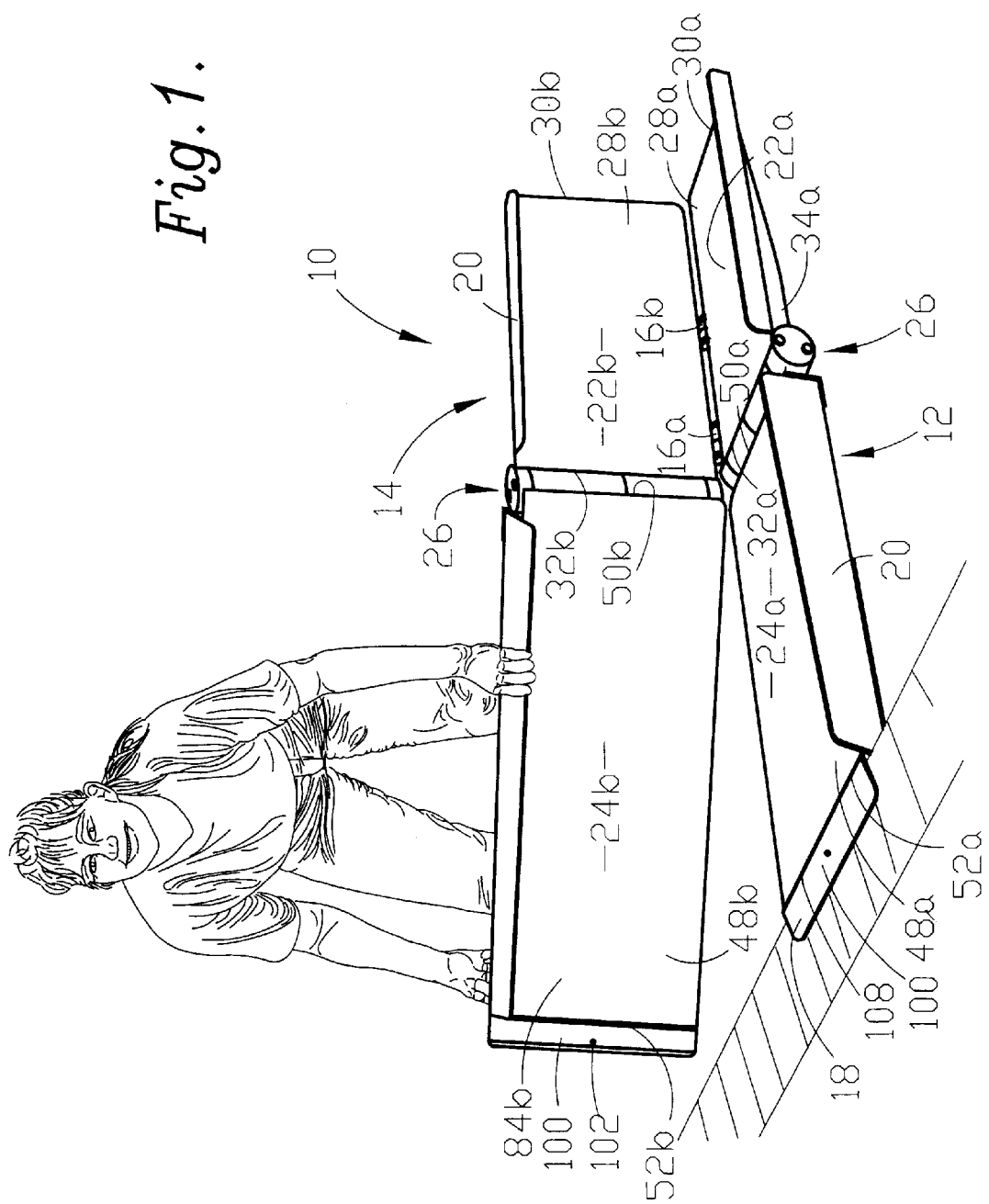
FIG. 1 is a pictorial view of a wheelchair ramp in accordance with a preferred embodiment of the present invention, wherein the ramp is shown being unfolded into its extended position on a walkway between an upper and lower elevation.

Referring initially to FIG. 1, a wheelchair ramp in accordance with the most preferred embodiment of the present invention is generally designated by the reference numeral 10. Ramp 10 has a left side 12 and a right side 14 joined by a pair of pivot joints 16(a), 16(b) such that the sides may be folded over one another into a compact position (See, FIGS. 3 and 4) and unfolded into a fully extended position (See, FIGS. 1 and 2). In its fully extended position, the ramp provides a relatively flat platform upon which a user in a wheelchair can travel from one elevation to another. As described more fully below, the ramp preferably includes a positioning hook 18 for supporting the ramp upon an underlying support surface such as the top of a series of steps. Ramp 10 also includes curb elements 20 extending along the outer edge of the ramp to properly guide the wheelchair along the ramp platform when in use.

Left and right sides 12, 14 mirror each other identically with each side comprising a lower first section 22(a), 22(b) and an upper second section 24(a), 24(b) pivotally connected to one another by a keyway joint 26 to enable the sections to be placed in an overlapping compact position (FIGS. 3 and 4) and unfolded into a fully extended position (FIGS. 1 and 2).

As best illustrated in FIG. 1, lower first section 22 has a substantially flat ramp surface 28(a), 28(b) extending from outer end 30(a), 30(b) to inner end 32(a), 32(b) to form a portion of the ramp platform on which the user will travel. Surface 28 is preferably formed of a relatively thin, lightweight and rigid material such as aluminum sheeting ranging from 0.03 to 0.5 inches thick, preferably ranging from 0.04 to 0.1 inches thick, and most preferably about 0.063 inches thick. Of course, any other relatively flat and rigid sheeting material would be suitable for these purposes including steel, stainless steel, wood or plastics.

Looking to FIG. 2, a pair of longitudinally extending inner support members 34, are spaced apart and secured to the bottom of ramp surface 28 to provide support to the surface. An outer support member 36 extends along a side edge of the bottom of ramp surface 28. Each support member 34, 36 is comprised of a rectangular tube extending from an outer end 40 to an inner end 42. Support members 34, 36 are preferably formed of an extruded tube of aluminum having a rectangular cross section, but may be formed of any other material and/or any other geometries known in the art to be capable of providing sufficient support to surface 28 under an anticipated load of at least two persons and a wheelchair at any given time. It is not necessary to use aluminum, but the material used is preferably lightweight to ease the burden of the person carrying the ramp when in the compact position. Support members 34, 36 may be secured to the bottom of surface 28 using any attachment method known in the art, and are preferably secured using metal adhesives and/or welding. A suitable metal adhesive for this purpose is sold under the trademark Lord Adhesive 406 by Lord Corporation Chemical Products Division of Erie, Pa.

In a preferred embodiment, a portion of support members 34, 36 are sloped at an angle toward their outer ends 40 so that the ramp can lie flush against the ground or other surface on which the ramp is setting without interference from the tube. This slope is preferably formed by cutting off the bottom wall and a portion of the side walls of the tube to form triangular shaped sidewalls 44 extending from about the middle of support members 34, 36 to form an apex at outer end 40. A flat aluminum base plate 46 may be welded or otherwise secured over the triangular cut sidewalls 44 to form a bottom wall for resting contact with the underlying ground or other surface on which the ramp is setting. Base plate 46 is preferably welded to the support members 34, 36, however, any other method of attachment known in the art would be considered suitable for these purposes.

Looking back to FIG. 1, upper second ramp section 24 has a substantially flat ramp surface 48(a), 48(b) extending from an inner end 50(a), 50(b) to an outer end 52(a), 52(b) to form a portion of the ramp platform on which the user will travel. Surface 48 is preferably formed of a relatively thin, lightweight and rigid material similar to that of ramp surface 28 previously described, and is preferably formed of a relatively thin aluminum sheeting. Tread traction tape (not shown) or other materials known in the art for enhancing user traction on smooth surfaces may be provided along the upper face of ramp surfaces 28, 48 to prevent a user from slipping on the surface. Suitable adhesive traction tape for this purpose is sold under the trademark Sparkle Black Flex Tread by Wooster of Wooster, Ohio, and under the trademark #3200 Safety Track by Jessup of McHenry, Ill. Alternatively, the upper face of surfaces 28, 48 could be treated to have a rough texture, or may include surface features such as bumps or ridges to enhance the user's traction on the surface.

Looking to FIG. 2, a pair of longitudinally extending inner support members 54, are spaced apart and secured to the bottom of ramp surface 48 to provide support to the surface. An outer support member 56 extends along a side edge of the bottom of ramp surface 48. Preferably, outer support member 56 is located along the opposite side edge on which outer support member 36 is located. As best shown in FIGS. 2 and 3, support members 54, 56 of second ramp section 24 are positioned offset from support members 34, 36 of first ramp section 22, so as to enable the ramps to be folded over one another into the compact position. Specifically, when the ramp sections are folded into the compact position, the inner support members 54 of the second ramp section 24 are positioned between an inner support member 34 and outer support member 36 of the first ramp section 22. Likewise inner support members 34 of first ramp section 22 are positioned between outer support member 56 and an inner support member 54 of the second ramp section.

As with support members 34, 36, each support member 54, 56 of the second section is preferably formed of an extruded tube of aluminum having a rectangular cross-section, but may be formed of any other material and/or of any other geometry as known in the art, so long as the tube provides sufficient support to surface 48 under an anticipated load of at least two (2) persons and a wheelchair at any given time. Each support member 54, 56 extends from an inner end 60 to an outer end 62 and is positioned below and secured to the bottom of surface 48. Any attachment means known in the art is suitable for these purposes, including via metal adhesives and welding as heretofore described.

Keyway joint 26 joins first and second sections 22, 24 to enable the ramp to move between a folded compact position and an open extended position. For purposes of this invention, a keyway joint is any joint having an outer member that rotates about an inner member, wherein the inner member limits the amount of rotation of the outer member.

In the preferred embodiment as shown in FIGS. 2, 3, and 8, keyway joint 26 extends transversely across and between first and second ramp sections 22 and 24. Keyway joint 26 has a pair of inner collars 64(a), 64(b) sandwiched between a pair of outer collars 66(a) and 66(b), and an internal shaft 68 about which collars 64, 66 rotate. Collars 64, 66 each have a tubular sidewall 70 which defines a substantially circular opening 72. Internal shaft 68 extends though the circular opening 72 of each collar, and is secured in place via fasteners 94 and endplates 96 as hereafter described. Collars 64, 66 each have a substantially flat vertical end wall 76 formed along one side of sidewall 70 with a ledge 78 extending perpendicularly outward from the bottom of the end wall. The top of end wall 76 defines a flat platform 79 extending inward toward sidewall 70 terminating at a longitudinally extending notch 80 formed in sidewall 70. Notch 80 has a depth equal to the thickness of ramp surfaces 28, 48 such that the ramp surfaces can lie flush on platform 79 and in notch 80 as hereafter described to provide a smooth transition surface for the ramp user.

Looking to FIGS. 2 and 5–8, first ramp section 22 is secured to inner collar 64(a) and outer collar 66(a), such that the inner end 32 of surface 28 is seated within notch 80 of each collar, and support members 34, 36 rest upon ledge 78 of each collar respectively in abutting engagement with end wall 76. Specifically, inner end 42 of each inner support member 34 abuts end wall 76 of inner collar 64(a), and an end portion of inner support member 34 rests upon ledge 78 of the inner collar. Similarly, inner end 42 of the outer support member 36 abuts end wall 76 of outer collar 66(a), and an end portion of outer support member 36 rests upon ledge 78 of the outer collar.

Second ramp section 24 is secured to inner collar 64(b) and outer collar 66(b) such that the inner end 50 of surface 48 is seated within notch 80 of each collar, and support members 54, 56 rest upon ledge 78 of each collar respectively in abutting engagement with end wall 76. Specifically, inner end 60 of each inner support member 54 abuts end wall 76 of inner collar 64(b), and an end portion of inner support member 60 rests upon ledge 78 of the inner collar. Inner end 60 of outer support member 56 abuts end wall 76 of outer collar 66(b) and an end portion of the outer support member 56 rests upon ledge 78 of the outer collar.

Support members 34, 36, 54, 56 may each be secured in place in relation to collars 64(a), 66(a), 64(a), 66(b) respectively, by any means known in the art. Preferably, the support members are secured to each end wall 76 and associated ledge 78 via metal adhesives and/or welding. The end of each ramp surface 28, 48 may also be secured to platform 79 flush against notch 80 of each collar 64, 66 by any attachment means known in the art and is preferably secured in place via metal adhesives and/or welding. By seating the surfaces 28, 48 within corresponding notches 80, the keyway joint 26 presents a substantially flat transition between the two surfaces when the ramp sections are in the extended position.

As shown in FIGS. 2 and 5–7, the diameter of each collar 64, 66 is preferably substantially the same measurement as the height of the support member 34, 36, 54, 56 to which it is attached. Inner collars 64 preferably have a length equal to or greater than the distance extending between the outer most side edges of inner support members 34, 54 so that the support members can rest fully upon ledge 78. The length of each outside collar 66 is substantially the width of the respective outer support member 36, 56. The cross sectional shapes of inner and outer collars 64, 66 are preferably identical.

Looking to FIG. 8, the inner surface of sidewall 70 is generally cylindrical in shape and includes a longitudinal rib 82 extending the length of the collar 64, 66 within opening 72. Rib 82 is positioned along the back of end wall 76 at approximately the mid-point height of end wall 76. Collars 64, 66 are preferably positioned in such a manner as to allow the internal shaft 68 to be inserted into all of the openings. The internal shaft 68 is generally cylindrical in shape and includes an outer wall 84 and an inner wall 86. The shaft outer wall 84 includes first and second outwardly protruding shoulders 88, 89 extending along the length of the shaft. The shoulders are preferably positioned on diametrically opposite sides of shaft 68, preferably 180 degrees from each other.

As shown in FIG. 5, in the folded, compact position the ribs 82 of each of the collars 64, 66 are aligned and abutting the first shoulder 88. Looking next to FIGS. 6 and 7, as the first upper 5 ramp section 24 is rotated with respect to the first lower ramp section 22, the ribs 82 of inner collar 64(a) and outer collar 66(a) of the first ramp section rotate about the shaft outer wall 84 until they abut with the second shoulder 89 in the extended position. The ribs 82 of inner collar 64(b) and outer collar 66(b) of the second ramp section remain in abutting engagement with the first shoulder 88. Because the first and second shoulders 88, 89 are located 180 degrees from each other, the ribs 82 of the collars limit rotational movement of the sections to a folded position where the ribs are all in abutment with a first shoulder 88, to an extended position where the ribs of the respective upper and lower ramp sections 22, 24 are abutting opposite shoulders.

The shaft inner wall 86 includes a pair of opposed, arcuately shaped fins 90, integrally formed in the inner wall 86 along each end of the shaft to define a cylindrical aperture 92 configured to receive a fastener 94 such as a bolt or a hinge pin.

To assemble the keyway joint 26, the inner collars 64 are secured to the respective inner support members 34, 54, and the respective outer collars 66 are secured to the outer support members 36, 56 as described above. Ramp surfaces 28, 48 are then secured to the support members 34, 36, 54, 56 and the collars 64, 66 as previously described. Next, the circular openings 72 are axially aligned with one another. Then, the internal shaft 68 is inserted into the circular openings 72. It is preferred that a high paraffin based wax grease or paste is used on the inner surface of opening 72 and the outer wall 84 of the internal shaft 68. The grease allows for easy rotation of the parts during movement of the ramp 10 between the extended and compact positions. Finally, an end plate 96 is placed over the openings 72 of each outside collar 66. The end plate 96 is fastened to the internal shaft with fasteners 94 threaded into the cylindrical aperture 92 formed by fins 90. End plate 96 prevents any contaminants from entering into the joint 26 during use, thus giving the lubricating grease a longer useful life.

Collars 64, 66 may be made of any rigid material and are preferably formed from extruded aluminum. The internal shaft 68 may also be made of any rigid material and is also preferably formed from extruded aluminum.

Looking to FIGS. 1–4, positioning hook 18 is secured along outer end 52 of the second ramp surface 48 via a front face plate 98 extending perpendicularly downward from outer end 62. Face plate 98 is secured in place by welding the plate to the outer ends 62 of tubes 58. A downwardly sloped ledge 100 extending outwardly from the top edge of face plate 98 includes a bracing hole 102 centrally positioned within ledge 100 to receive a fastener (not shown). The fastener may be used to enable a user to fix the hook in position against a support surface, such as the top of a stair or the interior edge of a vehicle. Ledge 100 is preferably ridged along its top surface to enhance a user's traction at the top of the ramp. Positioning hook 18 is formed of any rigid material known in the art and is preferably formed of an extruded piece of aluminum.

As shown in FIG. 1, curb elements 20 extending generally perpendicular to ramp surfaces 28, 48 may be provided along the outer edges of the surfaces 28, 48. The curb elements may be formed of any rigid material known in the art, and preferably comprise extruded aluminum. Curb elements 20 may be secured along the outer edges of surfaces 28, 48 in any manner known in the art. In the preferred embodiment, curb elements 20 include a slot (not shown) integrally formed along the inner face of the curb, in which the outside edges of surfaces 28, 48 are received. Alternatively, curb elements 20 may include a bottom flange (not shown), secured along the bottom of surfaces 28, 48 via metal adhesives or welding. The curb elements 20 may also be integrally formed from the surfaces 28, 48 by bending the outer edges.

As shown in FIGS. 5, 6 and 7, the keyway joint 26 is configured to rotate around 180 degrees. In the compact position, the ribs 82 of each of the collars 64, 66 are in axial alignment. As the ramp sections 22, 24 are rotated into the extended position, the ribs 82 of collars 64(a), 66(a) attached to first ramp section 22 are rotated 180 degrees relative to the ribs 82 of the collars 64(b), 66(b) attached to second ramp section 24. In the extended position, the shoulders 88, 89 of the internal shaft 68 abut the ribs 82 and prevent further movement. The abutment of the ribs and the shoulders provide a sufficient force about the radius to counteract the torsional moment created during normal use of the ramp. It is to be understood the angle of rotation can be increased or decreased by modifying the arc length between the shoulders 88, 89.

Looking again to FIG. 1, ramp assembly 10 may be folded into its compact position by first lifting right side 14 about the keyway joint 26, until lower first ramp surface 22(b) is positioned generally perpendicular the lower first ramp surface 22(a) of left side 12. Upper second ramp section 24(b) is then pivoted about the keyway joint 26 to position ramp sections 22(b) and 24(b) in overlapping relationship, such that the bottom surfaces of each ramp section are facing one another. The entire ramp section is then turned on its side to enable upper second ramp section 24(a) of the left side to be pivoted about keyway joint 26 to rest in overlapping relationship with ramp section 22(a) such that the bottom of the ramp sections are facing one another as shown in FIG. 4. Ramp 10 may be transported in this compact position via use of a bracketed handle 104 secured along the side edges of the overlapping surfaces as is known in the art.

In order to place the ramp into the extended position, the compacted ramp is first set on the ground on its side and upper second ramp section 24(a) is pivoted outward about the keyway joint 26 to an extended position. The extended left side 12 then positioned on the ground or other surface upon which the ramp is intended to rest, with positioning hook 18 placed along the edge of the elevated surface. Upper second ramp section 24(b) of the right side is then pivoted about keyway joint 26 to the extended position as shown in FIG. 2. The right side is then lifted about pivot joints 16, and positioned on the ground adjacent the left side, with positioning hook 18 placed along the edge of the elevated surface.

While specific embodiments have been shown and discussed, various modifications may of course be made. In particular, while the preferred embodiment shows three support members attached to each ramp surface, the ramp could include a minimum of one and potentially two or more. The support members could be formed integrally with the ramp surface, or with parts of the keyway joint. The embodiment shown includes four collars, the ramp could include two collars, three collars, or other desired variations. It is to be understood that internal shaft 68 could include an outwardly extending longitudinal rib and each of the collars could include an inwardly extending pair of shoulders that are configured to limit the rotation of the keyway joint. Furthermore, the configuration of the collars and support members, and method of attaching the same may vary without departing from the invention.

It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter described herein or shown in the drawings is to be interpreted as illustrative, and not in a limited sense. It is to be understood that while certain forms of this invention have been illustrated and described, the invention is not limited to the specific forms or arrangement of parts described thereto, except insofar as such limitations are included in the following claims.

What is claimed and desired to be secured by letters patent is as follows:

1. A folding ramp configured to be placed between two elevations thereby supporting a weight of a person traveling between the elevations, said ramp comprising:

a first ramp section including a first ramp surface and at least one first support member secured to a bottom of said first ramp surface;

a second ramp section including a second ramp surface and at least one second support member secured to a bottom of said second ramp surface; and a keyway joint pivotally connecting said first ramp section with said second ramp section wherein said keyway joint allows said first ramp section to pivot a limited amount of about 180 degrees with respect to said second ramp section from a compact position to an extended position.

2. The folding ramp as set forth in claim 1, wherein said keyway joint comprises a first rotating member having at least one shoulder and a second rotating member having a rib, wherein said rib is configured to abut said shoulder in such a manner as to limit the amount of rotation between said members.

3. The folding ramp as set forth in claim 2, wherein said first rotating member is an internal shaft about which said second rotating member rotates.

4. The folding ramp as set forth in claim 1, wherein said keyway joint comprises a first collar attached to said first ramp section, a second collar attached to said second ramp section, and an inner shaft inserted into said collars.

5. The folding ramp as set forth in claim 4, wherein said collars each include an inner side wall having a rib and wherein said inner shaft includes a pair of outwardly extending shoulders configured to abut each of said ribs in such a manner as to limit the amount of rotation of said keyway joint.

6. The folding ramp as set forth in claim 5, wherein said shoulders extend substantially the entire length of said internal shaft.

7. The folding ramp as set forth in claim 5, wherein said rotation is limited to about 180 degrees.

8. The folding ramp as set forth in claim 5, wherein said inner shaft is substantially cylindrical in shape and includes a pair of shoulders configured to limit pivotal movement of said keyway joint.

9. The folding ramp as set forth in claim 1, wherein said keyway joint comprises:
   a collar having a substantially cylindrical opening and a longitudinal rib that extends axially inward along substantially the entire length of said cylindrical opening; and
   an internal shaft inserted into said opening and configured to rotate within said collar, said shaft including at least one longitudinal shoulder that substantially extends axially outward along the length of said inner shaft, said shoulder being configured to abut said longitudinal rib in such a manner as to limit rotational movement of said shaft.

10. The folding ramp as set forth in claim 9, wherein said shaft includes a pair of shoulders that are diametrically opposed so as to limit rotational movement of said keyway joint to about 180 degrees.

11. The folding ramp as set forth in claim 1, wherein said keyway joint comprises:
   a plurality of first collars attached to said first ramp section;
   a plurality of second collars attached to said second ramp section; and
   an inner shaft configured to be inserted into said collars in such a manner as to allow rotational movement of said first ramp section with respect to said second ramp section.

12. The folding ramp as set forth in claim 11, wherein said inner shaft is substantially cylindrical in shape and limits rotational movement to about 180 degrees.

13. The folding ramp as set forth in claim 11, wherein each of said collars includes a rib that substantially extends the length of said collar and wherein said shaft includes first and second shoulders that extend substantially along the length of said shaft and is configured to abut said ribs in such a manner as to limit rotational movement of said keyway joint.

14. The folding ramp as set forth in claim 13, the keyway joint is configured such that each rib of said first and second collars abuts with said first shoulder when said ramp is in a compact position, and each rib of said first collar abuts with said second shoulder while each rib of said second shoulder remains in abutment with said first shoulder when said ramp is in an extended position.

15. The folding ramp as set forth in claim 11, wherein each of said first collars is attached to a plurality of first support members.

16. The folding ramp as set forth in claim 1, wherein said keyway joint joins said first and second ramp sections in such a manner as to present a substantially flat transition between said first and second ramp surfaces.

17. The folding ramp as set forth in claim 16, wherein said keyway joint has a diameter that is substantially the same as the height of said support members.

18. A folding ramp configured to be placed between two elevations thereby supporting a weight of a person traveling between the elevations, said ramp comprising:
   a first ramp section including a first ramp surface and a plurality of first support members extending longitudinally along and secured to a bottom of said first ramp surface;
   a second ramp section including a second ramp surface and at least one second support member extending longitudinally along and secured to a bottom of said second ramp surface, wherein each of said first support member is positioned offset from said at least one second support member, such that said second support member lies adjacent said first support member when the ramp is in said compact position; and
   a keyway joint pivotally connecting said first ramp section with said second ramp section;
   wherein said keyway joint comprises a plurality of first collars attached to said first ramp section; a plurality of second collars attached to said second ramp section; and an inner shaft configured to be inserted into said collars in such a manner as to allow rotational movement of said first ramp section with respect to said second ramp section;
   wherein each of said first collars is attached to a respective first support member.

19. A ramp configured to be placed between two elevations thereby supporting a weight of a person traveling between the elevations, said ramp comprising:
   a first ramp section including a first ramp surface, at least one first collar extending along one end of the ramp surface and at least one first support member secured to a bottom of said first ramp surface and connected to said first collar;
   a second ramp section including a second ramp surface, at least one second collar extending along one end of the ramp surface and at least one second support member secured to a bottom of said second ramp surface and connected to said second collar; and
   an internal shaft separate from said first and second ramp sections configured to be inserted into said collars when said first collar is axially aligned with said second collar allowing said first collar to rotate about 180 degrees with respect to said second collar and thereby pivotally connecting said ramp sections so as to enable the ramp to be folded into compact and extended positions.

20. The ramp as set forth in claim 19 further comprising:
   a third ramp section and a fourth ramp section that define a right side of the ramp, wherein said first ramp section and said second ramp section define a left side of the ramp, wherein said right side and said left side substantially mirror each other, the ramp sections of each side being pivotally connected to one another in such a manner that the sides may be folded over one another in an overlapping compact position, and unfolded into an extended position for use, and wherein said first and third ramp sections are respectively pivotally connected to said second and fourth ramp sections.

21. A folding ramp configured to be placed between two elevations thereby supporting a weight of a person traveling between the elevations, said ramp comprising:

a first ramp section including a first ramp surface and at least one first support member secured to a bottom of said first ramp surface;

a second ramp section including a second ramp surface and at least one second support member secured to a bottom of said second ramp surface; and a keyway joint pivotally connecting said first ramp section with said second ramp section wherein said keyway joint enables the ramp to be folded about 180 degrees between a relatively compact position wherein the first and second ramp surfaces are folded over one another in overlapping relationship to an unfolded extended position wherein the first and second ramp surfaces for a relatively flat platform for use.

* * * * *